United States Patent [19]

Konopka et al.

[11] Patent Number: 5,767,631
[45] Date of Patent: Jun. 16, 1998

[54] POWER SUPPLY AND ELECTRONIC BALLAST WITH LOW-COST INVERTER BOOTSTRAP POWER SOURCE

[75] Inventors: John G. Konopka, Barrington; Dennis L. Stephens, Niles; Jeffrey D. Merwin, Buffalo Grove, all of Ill.

[73] Assignee: Motorola Inc., Schaumburg, Ill.

[21] Appl. No.: 771,186

[22] Filed: Dec. 20, 1996

[51] Int. Cl.$^6$ .................................................. G05F 1/00
[52] U.S. Cl. ..................... 315/307; 315/224; 315/209 R; 315/127
[58] Field of Search .................................. 315/307, 224, 315/209 R, 291, 247, 225, 127, 244, 297, DIG. 5

[56] References Cited

U.S. PATENT DOCUMENTS

| | | | |
|---|---|---|---|
| 4,523,131 | 6/1985 | Zansky | 315/307 |
| 5,089,753 | 2/1992 | Mattas | 315/324 |
| 5,225,742 | 7/1993 | Beasley | 315/307 |
| 5,293,099 | 3/1994 | Bobel | 315/225 |
| 5,399,944 | 3/1995 | Konopka et al. | 315/219 |
| 5,424,613 | 6/1995 | Moriarty, Jr. | 315/209 R |
| 5,475,284 | 12/1995 | Lester et al. | 315/209 R |
| 5,493,181 | 2/1996 | Shackle et al. | 315/241 R |
| 5,500,576 | 3/1996 | Russell et al. | 315/307 |
| 5,521,467 | 5/1996 | Statnic et al. | 315/247 |
| 5,528,147 | 6/1996 | Konopka | 315/225 X |
| 5,612,597 | 3/1997 | Wood | 315/293 |
| 5,650,694 | 7/1997 | Jayaraman et al. | 315/225 |

*Primary Examiner*—Robert Pascal
*Assistant Examiner*—Haissa Philogene
*Attorney, Agent, or Firm*—Kenneth D. Labudda; Gary J. Cunningham

[57] ABSTRACT

A power supply (10) for powering a load (500) includes an inverter (100), a series resonant output circuit (200), and a bootstrap power source (300) for supplying operating power to an inverter driver circuit (110). The bootstrap power source (300) is coupled in series with the load (500) via a dc blocking capacitor (240) and provides automatic shutdown of the inverter (100) by ceasing to supply operating power to the inverter driver circuit (110) when the load (500) fails to conduct current or is removed.

20 Claims, 7 Drawing Sheets

POWER SUPPLY AND ELECTRONIC BALLAST WITH LOW-COST INVERTER BOOTSTRAP POWER SOURCE

FIELD OF THE INVENTION

The present invention relates to the general subject of power supplies and, in particular, to a power supply and electronic ballast with a low-cost inverter bootstrap power source.

BACKGROUND OF THE INVENTION

Several types of power supplies and electronic ballasts utilize an inverter and a series resonant output circuit to convert a direct current (dc) input voltage into a high frequency alternating current (ac) for powering a load or gas discharge lamps. An important class of power supplies and ballasts includes a driven, as opposed to self-oscillating, inverter that includes a driver circuit for controlling inverter switching.

In driven inverters, a dc power source is needed in order to supply operating power to the driver circuit. In addition, a protection circuit is needed to prevent self-destruction of the inverter in the event of removal or failure of the load or lamps. Protection is achieved by either shutting down or significantly altering the operating frequency of the inverter in response to a no-load condition. The need for protection is particularly important in the case of an inverter that drives a series resonant output circuit at a frequency that is at or near the natural frequency of the output circuit, since extreme overvoltage and prompt destruction of the inverter is virtually assured under no load conditions.

In conventional power supplies and ballasts, the dc power source and the protection circuit are implemented using separate, dedicated circuits. In addition, the protection circuit typically has a complex structure and requires a relatively large number of electrical components. The end result is a power supply or ballast that is both costly and difficult to manufacture.

It is thus apparent that a power supply and electronic ballast with a bootstrap power source that efficiently provides operating power for the inverter driver circuit, and that also provides protection for the inverter without requiring extensive or complex additional circuitry, would constitute a significant improvement over the prior art.

DETAILED DESCRIPTION OF THE PREFERRED EMBODIMENTS

Figure 1:
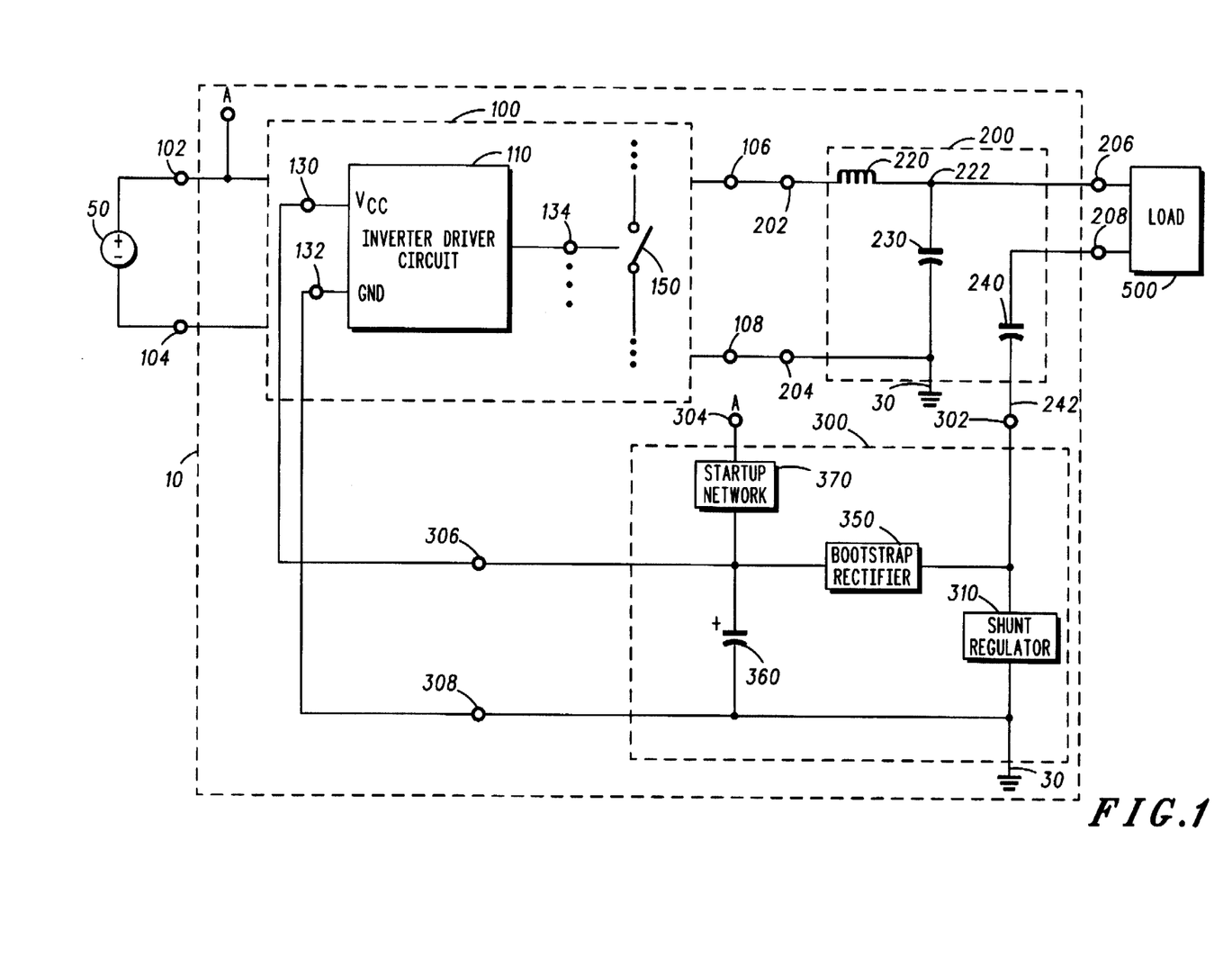
FIG. 1 is a block diagram and partial schematic of a power supply that includes an inverter bootstrap power source configured to deliver power to the inverter driver circuit during the positive half cycles of the load current, in accordance with the present invention.

FIG. 1 describes an electronic power supply circuit 10 comprising an inverter 100, a series resonant output circuit 200, and a bootstrap power source 300. Inverter 100 includes first and second input connections 102,104 for receiving a source of voltage 50, and first and second output connections 106,108. The second output connection 108 is coupled to a circuit ground node 30. Inverter 100 comprises at least one inverter switch 150 and an inverter driver circuit 110 that includes a dc supply input 130, a ground reference input 132, and at least one drive output 134 coupled to inverter switch 150. Inverter 100 may be implemented using any of a number of topologies, such as a half-bridge inverter or a single switch inverter similar to that disclosed in U.S. Pat. No. 5,399,944, issued to Konopka. Inverter switch 150 may consist of a bipolar junction transistor, a field-effect transistor, or any of a number of controllable power switching devices. Inverter driver circuit 110 may be implemented using either discrete components or an integrated circuit (IC). In the case of a half-bridge inverter, inverter driver circuit 110 is preferably realized using a conventional pulse-width modulator (PWM) IC, such as the MC2844 manufactured by Motorola, in combination with a drive isolation transformer.

The series resonant output circuit 200 has first and second input wires 202,204 that are coupled to the inverter output connections 106,108, and first and second output wires 206,208 adapted for connection to a load 500. Series resonant output circuit 200 comprises a resonant inductor 220, a resonant capacitor 230, and a dc blocking capacitor 240. Resonant inductor 220 is coupled between the first input wire 202 and a first node 222, where the first node is coupled to the first output wire 206. Resonant capacitor 230 is coupled between the first node 222 and the circuit ground node 30, and dc blocking capacitor 240 is coupled between the second output wire 208 and a second node 242.

Bootstrap power source 300 is coupled between the second node 242 and the circuit ground node 30, and includes a first input terminal 302 that is coupled to the second node 242, a second input terminal 304 that is coupled to the first input connection 102 of inverter 100, a first output terminal 306 that is coupled to the dc supply input 130 of inverter driver circuit 110, and a second output terminal 308 that is coupled to the ground reference input 132 of inverter driver circuit 110.

By virtue of its effective series connection with the load 500 via dc blocking capacitor 240, bootstrap power source 300 is operable to supply continuous operating power to inverter driver circuit 110 when an operating (i.e., conducting) load is present between the output wires 206, 208. Additionally, bootstrap power source 300 automatically protects the inverter 100 from sustained overvoltage by ceasing to supply continuous operating power to the inverter driver circuit 110 when an operating load 500 is not present between output wires 206,208. Power supply 10 thus includes a highly economical bootstrap power source 300 that efficiently supplies operating power to the inverter driver circuit 110 and that, at the same time, protects the inverter 100 in the event of removal or failure of load 500.

Referring again to FIG. 1, in one embodiment of power supply 10, bootstrap power source 300 comprises a shunt regulator 310, a bootstrap rectifier 350, a filtering capacitor 360, and a startup network 370. Shunt regulator 310 is coupled between the first input terminal 302 and circuit ground node 30. When an operating load 500 is present between output wires 206,208, shunt regulator 310 operates as a voltage clamp during the positive half cycles of the load current (i.e., during those periods of time in which a positive current flows from output wire 206, through load 500, and into output wire 208). Bootstrap rectifier 350, which is coupled between the first input terminal 302 and the first output terminal 306, provides a unidirectional path through which a portion of the load current is transferred to filtering capacitor 360. Filtering capacitor 360 is coupled between the first and second output terminals 306,308, and supplies dc operating power to inverter driver circuit 110. The second output terminal 308 is coupled to circuit ground node 30. Startup network 370, which is coupled between the second input terminal 304 and the first output terminal 306, provides current for charging up filtering capacitor 360 in order to initially start inverter driver circuit 110 and inverter 100 after power is first applied to power supply 10.

Figure 2:
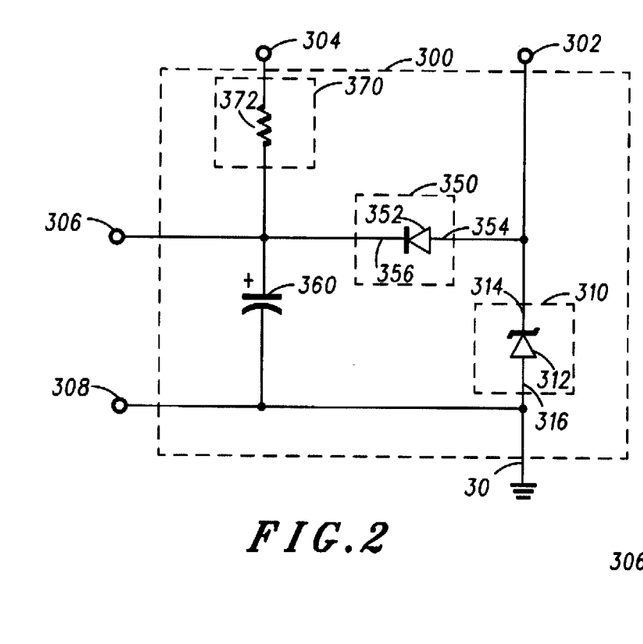
FIG. 2 is a circuit schematic of an inverter bootstrap power source that includes a zener diode and that is configured to deliver power to the inverter driver circuit during the positive half cycles of the load current, in accordance with the present invention.

Turning now to FIG. 2, in one embodiment of bootstrap power source 300, shunt regulator 310 comprises a zener diode 312, bootstrap rectifier 350 comprises a bootstrap diode 352, and startup network 370 comprises a startup resistor 372. Zener diode 312 has a cathode 314 coupled to the first input terminal 302 and an anode 316 coupled to circuit ground node 30. Bootstrap diode 352 has an anode 354 coupled to the first input terminal 302 and a cathode 356 coupled to the first output terminal 306. Startup resistor 372 is coupled between the second input terminal 304 and the first output terminal 306.

Figure 3:
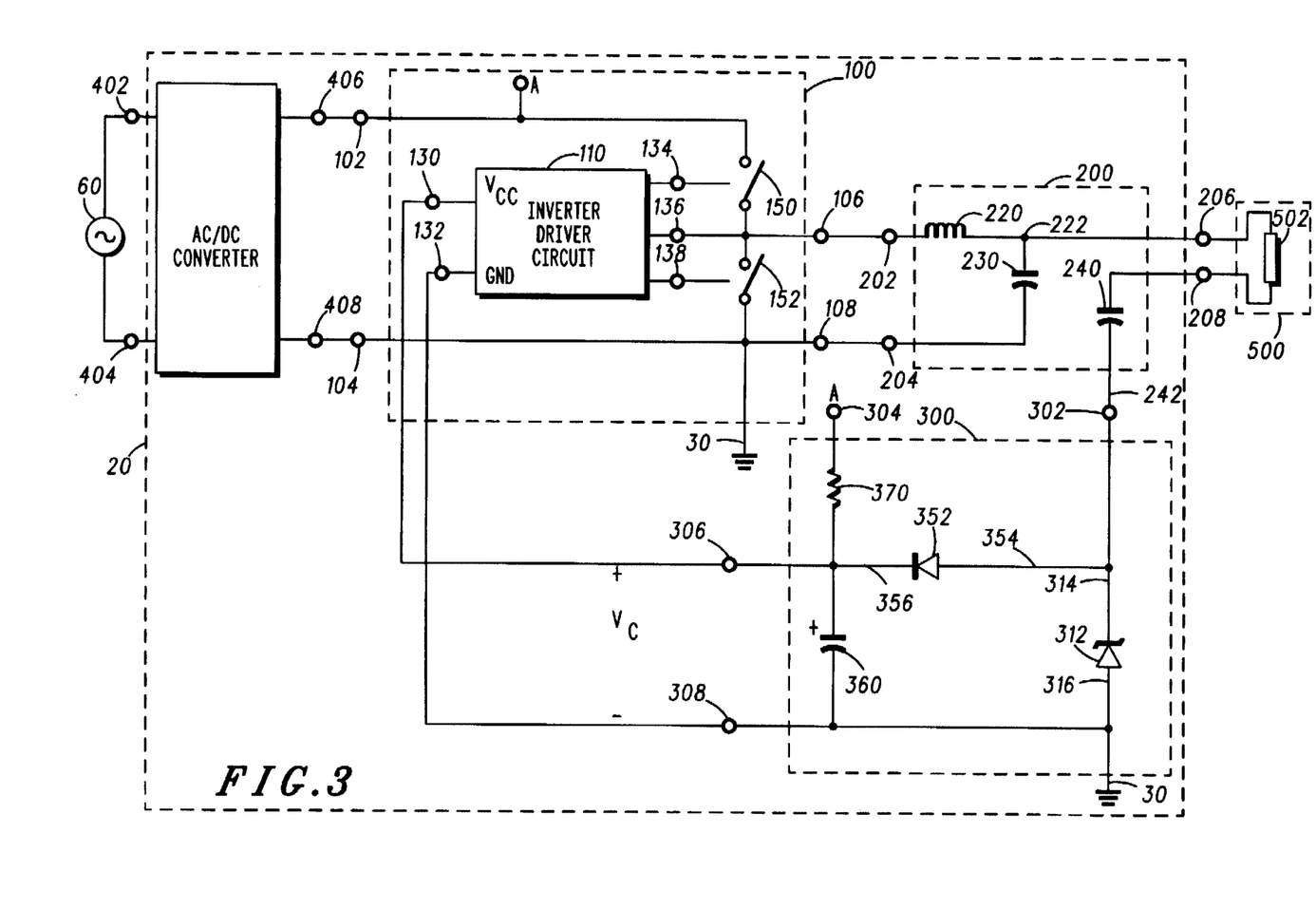
FIG. 3 is a circuit schematic of an electronic ballast that includes the bootstrap power source of FIG. 2, in accordance with the present invention.

An electronic ballast 20 that incorporates the bootstrap power source 300 is described in FIG. 3. The ballast 20 comprises an AC/DC converter 400, a half-bridge inverter 100, a series resonant output circuit 200, and the bootstrap power source 300 of FIG. 2. The ballast 20 is adapted to power a load 500 that comprises at least one gas discharge lamp 502.

AC/DC converter 400 includes a pair of input wires 402,404 that are adapted to receive a source of alternating current 60, and a pair of output wires 406,408. Inverter 100 has first and second input connections 102,104 coupled to the output wires 406,408 of AC/DC converter 400, and first and second output connections 106,108.

Inverter 100 includes a first inverter switch 150 coupled between the first input connection 102 and the first output connection 106, a second inverter switch 152 coupled between the first and second output connections 106,108, and inverter driver circuit 110. Inverter driver circuit 110 includes a first drive output 134 coupled to the first inverter switch 150, a second drive output 136 coupled to the first output connection 106, and a third drive output 138 coupled to the second inverter switch 152.

The detailed operation of bootstrap power source 300 in ballast 20 is now explained with reference to FIG. 3. Following application of ac power to ballast 20, inverter 100 is initially off and remains off until such time as inverter driver circuit 110 begins to operate. Inverter driver circuit 110 is also initially off and does not begin to operate until a predetermined turn-on voltage, hereinafter referred to as $V_{ON}$, is provided between dc supply input 130 and ground reference input 132. If inverter driver circuit 110 is implemented using a standard IC driver, $V_{ON}$ is typically on the order of about 9 volts. With inverter 100 off, no power is provided to lamp 502 and, consequently, no current flows into the first input terminal 302 of bootstrap power source 300.

Shortly after ac power is applied to ballast 20, a rectified voltage develops across the output wires 406,408 of AC/DC converter 400, which causes a charging current to flow through startup resistor 372 and into filtering capacitor 360. Due to this charging current, the voltage, $V_C$, across capacitor 360 increases steadily and eventually reaches $V_{ON}$, at which time inverter driver circuit 110 is activated. Inverter driver circuit 110 then starts commutating inverter switches 150,152 in a complementary fashion and at a frequency that is reasonably close to the natural resonant frequency of inductor 220 and capacitor 230.

Within a short period of time following startup of inverter driver circuit 110, a sufficiently high voltage develops across resonant capacitor 230 to ignite gas discharge lamp 502. Once lamp 502 is ignited, a lamp current, $I_{LAMP}$, begins to flow through lamp 502, dc blocking capacitor 240, and into the first input terminal 302 of bootstrap power source 300. As is well known in the art regarding half-bridge inverters, within the first cycles of $I_{LAMP}$, dc blocking capacitor 240 charges up to a voltage that is approximately equal to one-half of the dc (average) value of the voltage provided across inverter input connections 102,104. In this way, a substantially symmetrical ac current is provided to lamp 502.

During the positive half-cycles of $I_{LAMP}$ (i.e., during those periods in which a positive current flows from output wire 206, through lamp 502, and back into output wire 208), $I_{LAMP}$ flows into input terminal 302, through bootstrap diode 352, and into filtering capacitor 360. This replenishes the energy in capacitor 360 and causes $V_C$ to increase, and thus makes direct use of $I_{LAMP}$ to supply the operating power requirements of inverter driver circuit 110. Zener diode 312 provides regulation of the voltage supplied to inverter driver circuit 110 by limiting $V_C$ to a value of about $V_Z$. That is, neglecting the forward voltage drop across bootstrap diode 352, if $V_C$ attempts to exceed $V_Z$, zener diode 312 will turn on and conduct current from the cathode 314 to the anode 316. With zener 312 operating in the zener mode, the supply of replenishing current to capacitor 360 is essentially terminated. Due to the current being drawn out of capacitor 360 by driver circuit 110, $V_C$ will then begin to decrease and will continue to decrease until the next positive half cycle of $I_{LAMP}$, at which time replenishing current will once again be supplied to capacitor 360 in the aforementioned manner.

During the negative half-cycles of $I_{LAMP}$ (i.e., during those periods in which a positive current flows from output wire 208, through lamp 502, and back into output wire 206), no replenishing current is provided to capacitor 360. That is, capacitor 360 supplies the operating power required by driver circuit 110 entirely on its own stored energy. During this time, zener diode 312 is forward-biased and behaves as a normal rectifier diodes allowing $I_{LAMP}$ to flow from circuit ground node 30, through zener diode 312, and out of input terminal 302. Consequently, during the negative half-cycles of $I_{LAMP}$, the voltage at input terminal 302 will be at a small negative value of about −0.6 volts, due to the forward voltage drop across zener diode 312.

In many applications, in order to minimize power dissipation in startup resistor 372, it is desirable that the resistance of resistor 372 be set to as high a value as possible. Consequently, the resulting charging current that flows through startup resistor 372 is considerably less than the operating current drawn by inverter driver circuit 110 when the driver circuit 110 is active. As a result, once driver circuit 110 turns on, the current taken out of capacitor 360 (via first output terminal 306) far exceeds that which is put in (via resistor 372). Consequently, the voltage across filtering capacitor 360 begins to decay once driver circuit 110 is activated, and continues to decay for a period of time until lamp 502 ignites and replenishing current from $I_{LAMP}$ begins to be provided to capacitor 360 through diode 352.

It is important to note that most driver ICs, such as the MC2844 pulse-width modulator, are characterized by a turn-off voltage, $V_{OFF}$, below which the IC ceases to operate. Therefore, in order to achieve successful startup of inverter 100' and subsequent steady-state powering of inverter driver circuit 110, filtering capacitor 360 must be chosen to have a capacitance value that is large enough to completely supply the operating power requirements of driver circuit 110 during the period between activation of driver circuit 110 and ignition of lamp 502 without $V_C$ decaying to a value that is less than $V_{OFF}$.

For the sake of illustration, consider a MC2844 pulse-width modulator IC. Rough typical values for $V_{ON}$ and $V_{OFF}$ are about 14 volts and 10 volts, respectively, and the IC draws about 20 milliamperes of supply current when activated. In this case, in order to keep driver circuit 110 running long enough for the bootstrapping action of power source 300 to start (i.e., until lamp 502 ignites), capacitor 360 must be large enough to continuously supply 20 milliamperes of current without $V_C$ having fallen by more than about 4 volts. Thus, if capacitor 360 is not large enough, driver circuit 110 will turn off prematurely and inverter 100 will never achieve bootstrapping and steady-state operation.

In the event that lamp 502 fails to conduct current or is suddenly removed, $I_{LAMP}$ will no longer flow into input terminal 302. Consequently, capacitor 360 will no longer be replenished and $V_C$ will begin to decay. Inverter driver circuit 110 will initially remain active and continue to run off of the stored charge in capacitor 360 for a brief period of time, but will cease to operate once $V_C$ falls below $V_{OFF}$. In this way, bootstrap source 300 provides for automatic shutdown of the inverter driver circuit 110, and thus protects the inverter 100 from damage due to sustained overvoltage, in the event that lamp 502 is removed or failed.

Bootstrap source 300 also provides periodic re-strike attempts for igniting a replaced lamp without requiring that the ac power source be "cycled" (i.e., turned off and then on again). More specifically, when driver circuit 110 is shutdown following lamp removal or failure, $V_C$ is approximately equal to $V_{OFF}$. However, as driver circuit 110 no longer draws current from capacitor 360, the current flowing through resistor 372 serves to charge up capacitor 360, causing $V_C$ to increase. Once $V_C$ reaches $V_{ON}$, driver circuit 110 is activated. If an operable lamp is connected between output wires 206,208, bootstrap power source 300 will engage and supply operating power to driver circuit 110 as previously described. However, if an operable lamp is not present, bootstrapping cannot occur (due to the absence of $I_{LAMP}$) and driver circuit 110 will once again shut off after $V_C$ falls below $V_{OFF}$. The aforementioned behavior constitutes a "hiccup" mode that is maintained until an operable lamp is connected between output wires 206,208, at which time lamp 502 will be ignited, followed by bootstrapping and steady-state operation of inverter 100.

Figure 4:
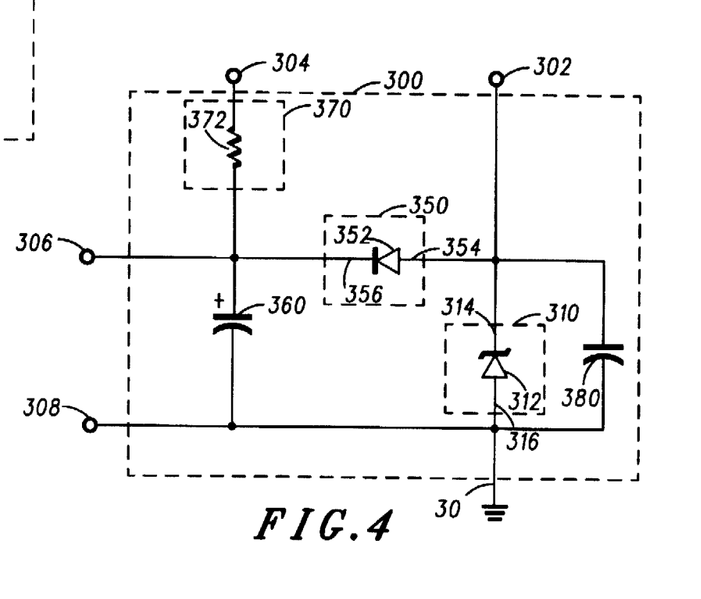
FIG. 4 is a circuit schematic of the inverter bootstrap power source of FIG. 2 modified to include a bypass capacitor in parallel with the zener diode, in accordance with the present invention.

Turning now to FIG. 4, bootstrap power source 300 optionally includes a bypass capacitor 380 coupled between the first input terminal 302 and the circuit ground node 30. The purpose of bypass capacitor 380 is to reduce the power dissipated in zener diode 312 by providing a bypass path for at least a portion of the lamp current to flow around, rather than through, zener diode 312 when zener 312 is in the reverse-conduction mode. Consequently, the average current that flows through zener diode 312 is reduced. Since the power dissipated in zener 312 is approximately equal to the arithmetic product of its zener voltage and the reverse-conduction current, a reduction in the magnitude of the reverse-conduction current causes a proportional reduction in the power dissipated in zener 312.

In the embodiments illustrated in FIGS. 2, 3, and 4, shunt regulator 310 is implemented using a zener diode 312.

Figure 5:
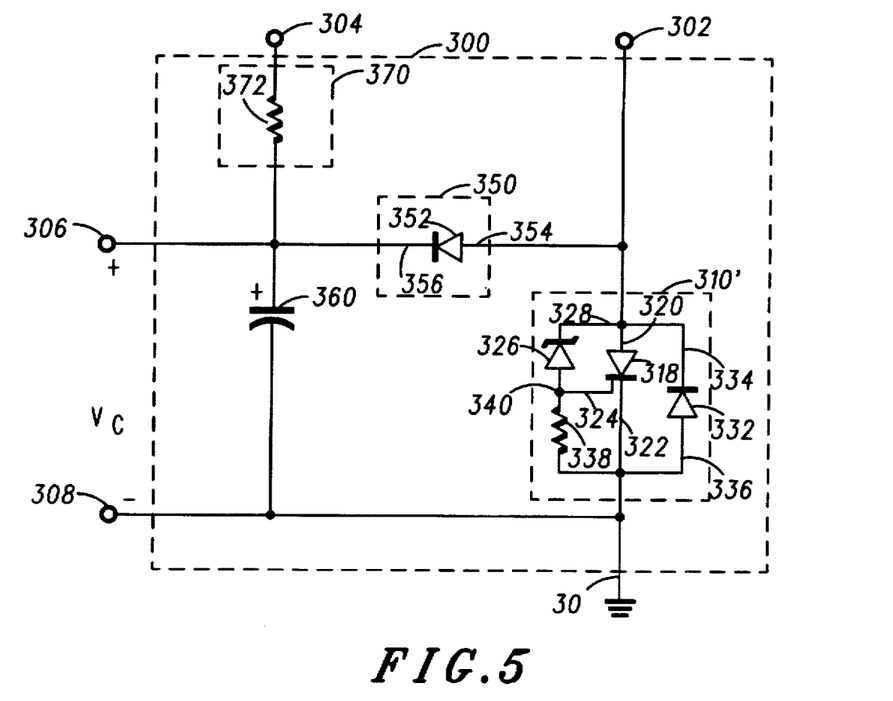
FIG. 5 is a circuit schematic of an inverter bootstrap power source that includes a switching regulator and that is configured to deliver power to the inverter driver circuit during the positive half cycles of the load current, in accordance with the present invention.

In order to further enhance the efficiency of bootstrap power source 300, the shunt regulator can also be implemented using a switching regulator in place of zener diode 312, as illustrated in FIG. 5.

As described in FIG. 5, shunt regulator 310' comprises an electronic switch 318, a zener diode 326, a bypass diode 332, and a biasing resistor 338. Electronic switch 318 may be realized using any of a number of controllable switching devices, such as a power transistor, a silicon controlled rectifier (SCR), and so forth. Electronic switch 318 is preferably implemented using a SCR having an anode 320 coupled to the first input terminal 302, a cathode 322 coupled to the circuit ground node 30, and a gate terminal 324 coupled to a third node 340. Zener diode 326 has a cathode 328 coupled to the first input terminal 302 and an anode 330 coupled to the third node 340. Bypass diode 332 has a cathode 334 coupled to the first input terminal 302 and an anode 336 coupled to circuit ground node 30. Finally, biasing resistor 338 is coupled between the third node 340 and circuit ground node 30.

In the circuit of FIG. 5, replenishing current is provided to capacitor 360 by way of bootstrap diode 350, and automatic protection of inverter 100' is provided in a fashion substantially identical to that previously described with reference to the circuit of FIG. 2. The manner in which regulation (voltage-limiting) is achieved using the bootstrap power source 310' of FIG. 5 is explained as follows. SCR 318 is activated and conducts current from anode 320 to cathode 322 when the voltage at input terminal 302 attempts to exceed the reverse breakdown voltage, $V_Z$, of zener diode 326. Specifically, when zener 326 turns on, current is injected into gate 324, thereby turning SCR 318 on. With SCR 318 on, the voltage at input terminal 302 drops to less than about one volt (for a SCR, the anode-to-cathode voltage, VAK, during forward conduction is typically about 0.7 volts). With the voltage at input terminal 302 at a low level, zener diode 326 turns off and current is no longer injected into gate 324. However, SCR 318 remains on as long as $V_{AK}$ remains non-negative. Since $V_{AK}$ remains non-negative until at least such time as $I_{LAMP}$ reverses in polarity during its negative half cycle, SCR 318 stays on for the remaining duration of the positive half-cycle of $I_{LAMP}$. The power dissipated in SCR 318 during the positive half-cycles of $I_{LAMP}$ is approximately proportional to the arithmetic product of $V_{AK}$ and $I_{LAMP}$. Since $V_{AK}$ is considerably less than $V_Z$ in the circuit of FIG. 3, the power dissipated in SCR 318 is considerably less than that which occurs in zener diode 312.

During the negative half-cycles of $I_{LAMP}$, $I_{LAMP}$ flows up from ground node 30, through bypass diode 332, and out of input terminal 302. SCR 318 is off during this time because $V_{AK}$ has a small negative value due to the forward voltage drop (approximately 0.6 volts) across bypass diode 332.

An important design consideration for bootstrap source 310' is that biasing resistor 338 be chosen to have a relatively low resistance value (e.g. 100 ohms) in order to achieve its primary function of preventing undesired premature triggering of SCR 318 due to leakage current that flows through the zener diode 326 prior to the zener diode 326 entering the reverse conduction mode.

The bootstrap power source 300 described in FIGS. 1–5 use a portion of each positive half cycle of the load current to supply operating power to the inverter driver circuit 110. In certain applications, it is desirable to use the positive half cycle of the load current for other purposes, such as in a power factor correction feedback scheme wherein at least a portion of each positive half-cycle of the load current is fed back to the input section of the power supply. In such cases, it is desirable to have an alternative configuration of bootstrap power source 300 that uses the negative, as opposed to positive, half cycles of the load current to supply operating power to inverter driver circuit 110. Such an alternative configuration, which may be referred to as a "floating" supply because of its inclusion of a ground reference that is at a different potential from that of circuit ground node 30, is described in the power supply 10' of FIG. 6.

Figure 6:
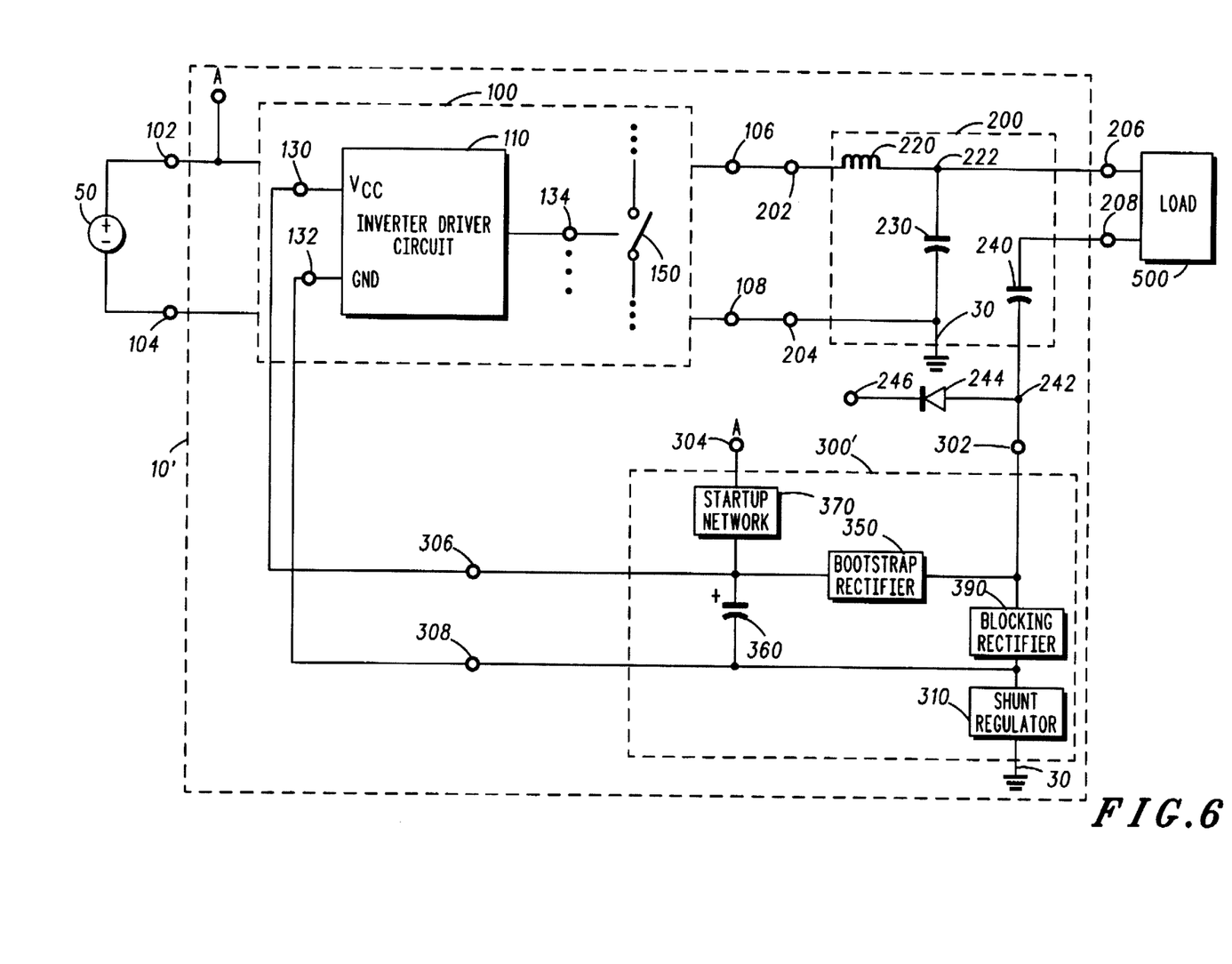
FIG. 6 is a block diagram and partial schematic of a power supply that includes an inverter bootstrap power source configured to deliver power to the inverter driver circuit during the negative half cycles of the load current, in accordance with the present invention.

Turning to FIG. 6, floating supply 300' has the following structure. Shunt regulator 310 is coupled between circuit ground node 30 and the second output terminal 308. bootstrap rectifier 350 is coupled between circuit ground node 30 and the first output terminal 306, filtering capacitor 360 is coupled between the first and second output terminals 306, 308, and startup network 370 is coupled between the second input terminal 304 and the first output terminal 306.

Bootstrap power source 300' also includes a blocking rectifier 390 that is coupled between the first input terminal 302 and the second output terminal 308.

The ground reference input 132 of driver circuit 110 is not connected to, but is "floating" with respect to, circuit ground node 30. It is important to appreciate that, in order for inverter driver circuit 110 to operate, it is not required that ground reference input 132 be connected to circuit ground node 30, but only that the appropriate positive operating voltage level exist between the dc supply input 130 and the ground reference input 132. Furthermore, in order for a "floating" supply embodiment to function properly, it is required that the positive half-cycles of the load current have a circuit path in which to return to circuit ground node 30.

Otherwise, dc blocking capacitor 240 will rapidly peak charge (i.e., charge up to a voltage equal to the peak value of the voltage provided across inverter output connections 106,108) and output circuit 200 will be rendered effectively non-functional with regard to providing power to load 500. For this reason, a feedback diode 244 is coupled between the second node 242 and a feedback wire 246, and is oriented to allow a positive current to flow from node 242 to feedback wire 246. An appropriate coupling point for feedback wire 246 is not shown in FIG. 6, but is shown and discussed below with reference to FIG. 8.

Figure 7:
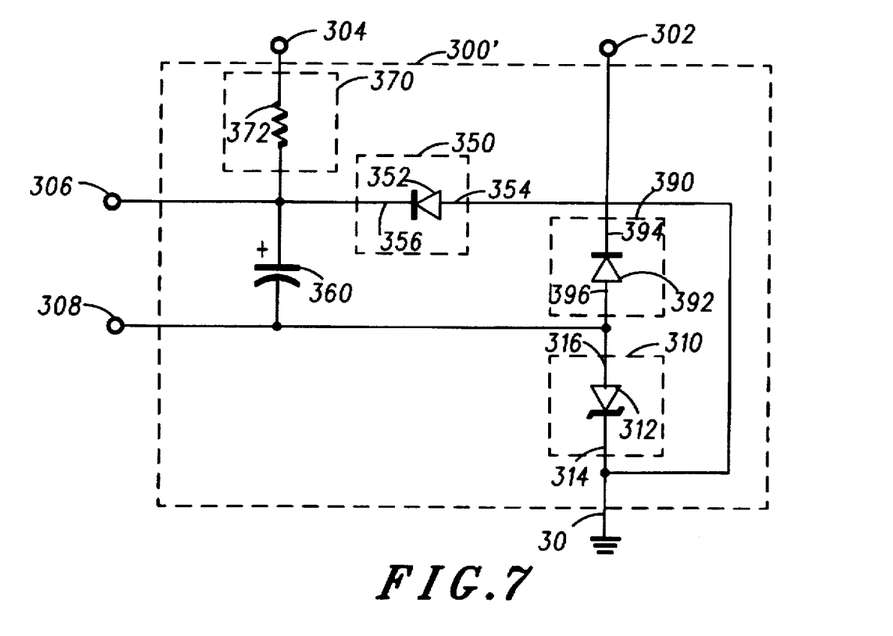
FIG. 7 is a circuit schematic of an inverter bootstrap power source that includes a zener diode and that is configured to deliver power to the inverter driver circuit during the negative half cycles of the load current, in accordance with the present invention.

Turning now to FIG. 7, in one floating supply embodiment, shunt regulator 310 comprises a zener diode 312, bootstrap rectifier 350 comprises a bootstrap diode 352, blocking rectifier 390 comprises a blocking diode 392, and startup network 370 comprises a startup resistor 372. Zener diode 312 has a cathode 314 coupled to circuit ground node 30 and an anode 316 coupled to the second output terminal 308. Bootstrap diode 352 has an anode 354 coupled to circuit ground node 30 and a cathode 356 coupled to the first output terminal 306. Blocking diode 392 has a cathode 394 coupled to the first input terminal 302 and an anode 396 coupled to the second output terminal 308. Finally, startup resistor 372 is coupled between the second input terminal 304 and the first output terminal 306.

Figure 8:
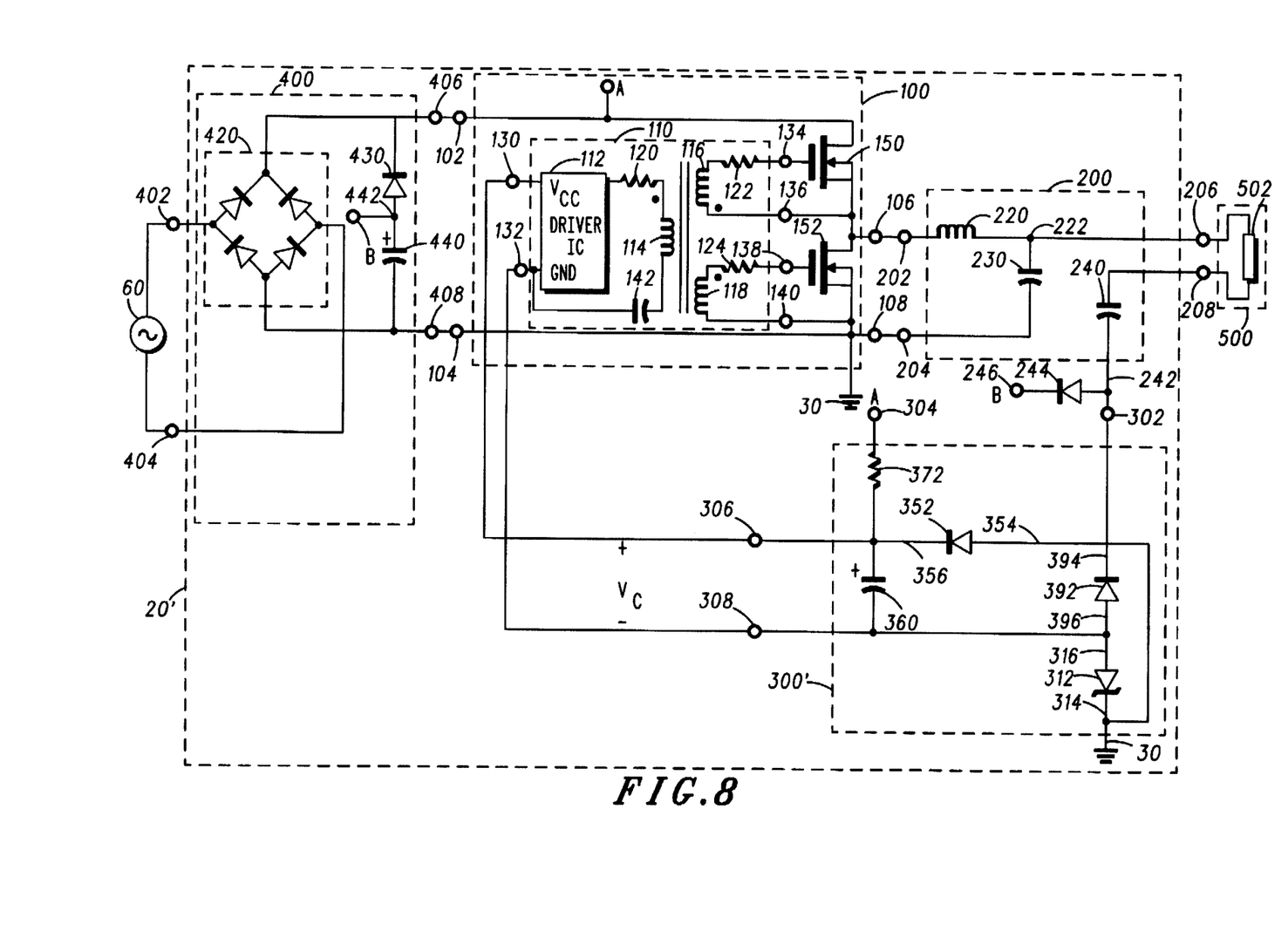
FIG. 8 is a circuit schematic of an electronic ballast that includes a half-bridge inverter and the bootstrap power source of FIG. 7, in accordance with a preferred embodiment of the present invention.

FIG. 8 describes a preferred embodiment of an electronic ballast 20' for driving at least one fluorescent lamp 502. Ballast 20' comprises an AC/DC converter 400, a half-bridge inverter 100, a resonant output circuit 200, and the bootstrap power source 300' described in FIG. 7. AC/DC converter 400 includes a full-wave bridge rectifier 420, a line blocking diode 430, and a bulk capacitor 440. Feedback diode 244 is coupled to a junction 442 of diode 430 and bulk capacitor 440, and serves to significantly reduce harmonic distortion in the ac line current by transferring the positive half-cycles of $I_{LAMP}$ to capacitor 440. Stated differently, improved power factor and total harmonic distortion are achieved by maintaining across bulk capacitor 440 a voltage that is significantly less than the peak value of the ac line voltage provided by ac source 60. Inverter driver circuit 110 comprises a driver IC 112 and a drive transformer having a primary winding 114 and two secondary windings 116,118 of opposite polarities. Driver resistors 120, 122, and 124 limit the currents that flow in the different windings 114, 116,118 of the drive transformer. Driver capacitor 142 acts as a dc blocking element that prevents the undesirable flow of dc current into primary winding 114.

The detailed operation of bootstrap power source 300' is now explained with reference to FIG. 8 as follows. Following application of ac power to ballast 20', capacitor 360 charges up through startup resistor 372. Specifically, charging current flows from the first input connection 102 of inverter 100 to circuit ground node 30 through startup resistor 372, filtering capacitor 360, and zener diode 312. Once $V_C$ reaches the turn-on voltage, $V_{ON}$, of driver IC 112, the driver IC 112 turns on and begins commutating inverter switches 150,152. Shortly thereafter, sufficiently high voltage develops across resonant capacitor 230 to ignite fluorescent lamp 502 and to establish a lamp current, $I_{LAMP}$. As explained previously, capacitor 360 relies entirely on its own stored energy to supply the operating power requirements of driver circuit 110 until such time as $I_{LAMP}$ begins to flow and bootstrapping begins.

Positive half-cycles of $I_{LAMP}$ are transferred to bulk capacitor 440 via feedback diode 244. Blocking diode 392 prevents any positive portion of $I_{LAMP}$ from flowing into input terminal 302. Negative half-cycles of $I_{LAMP}$ are used to replenish capacitor 360. Specifically, during the negative half-cycles of $I_{LAMP}$, current flows from circuit ground node 30, through bootstrap diode 352, into capacitor 360, through blocking diode 392, out of input terminal 302, and so forth. In this way, the energy in capacitor 360 is replenished. Capacitor 360 continues to be charged up by the negative half-cycles of $I_{LAMP}$ until such time as $V_C$ attempts to exceed the reverse breakdown voltage, $V_Z$, of zener diode 312, less one diode forward voltage drop. That is, assuming that $V_Z$=15 volts, and that diode 352 has a forward voltage drop of about 0.6 volts, $V_C$ will be limited to about 15−0.6= 14.4 volts. If $V_C$ attempts to exceed 14.4 volts, zener 312 will turn on and conduct current from cathode 314 to anode 316, thereby essentially terminating the supply of replenishing current to capacitor 360.

Bootstrap power source 300' provides automatic protection of inverter 100' in a substantially identical manner as described above with reference to FIG. 3. In summary, when lamp 502 fails or is removed, $I_{LAMP}$ no longer flows out of input terminal 302. Therefore, capacitor 360 is not replenished and driver IC 112 turns off once $V_C$ falls below $V_{OFF}$. If an operable lamp is not installed, bootstrap source will enter into a "hiccup mode" and provide automatic ignition of a replaced lamp without the need for cycling of the ac power to ballast 20'.

Figure 9:
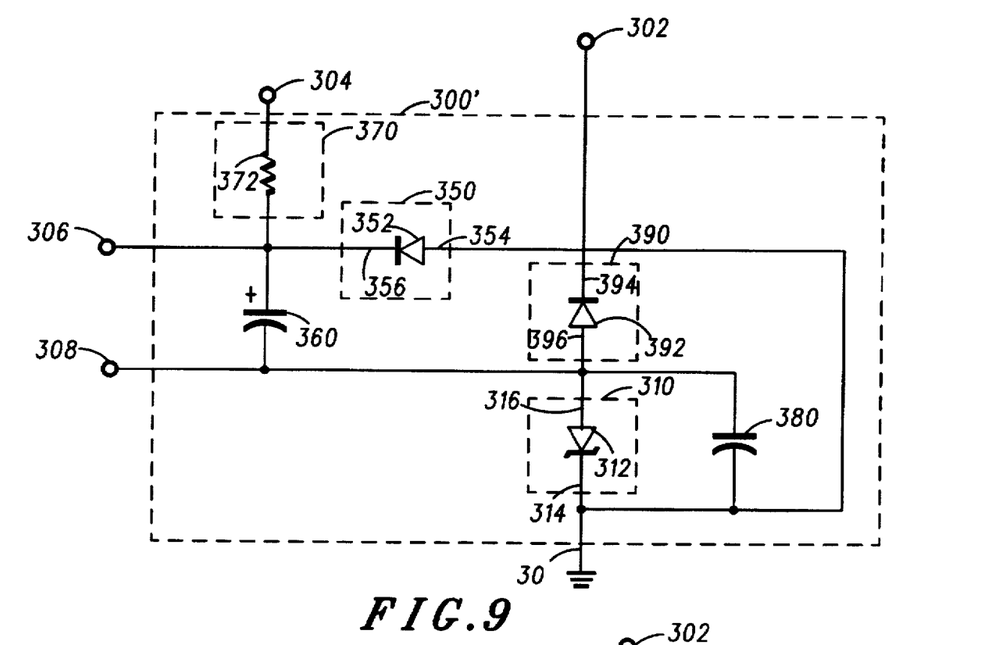
FIG. 9 is a circuit schematic of the inverter bootstrap power source of FIG. 7 modified to include a bypass capacitor in parallel with the zener diode, in accordance with the present invention.

As shown in FIG. 9, bootstrap power source 300' optionally includes a bypass capacitor 380 in parallel with zener diode 312. Bypass capacitor 380 reduces the power dissipated in zener diode 312 by providing a bypass path around zener diode 312 for at least a portion of each negative half cycle of $I_{LAMP}$.

Figure 10:
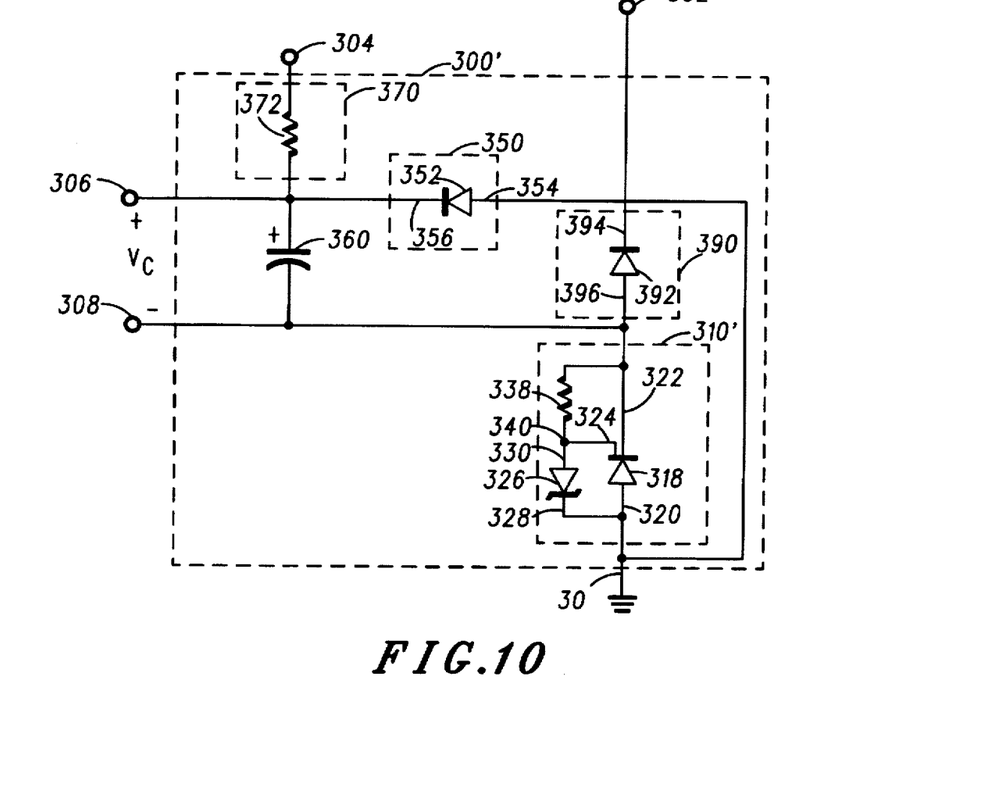
FIG. 10 is a circuit schematic of an inverter bootstrap power source that includes a switching regulator and that is configured to deliver power to the inverter driver during the negative half cycles of the load current, in accordance with the present invention.

Turning now to FIG. 10, bootstrap power source 300' may be realized with enhanced energy efficiency by using a switching regulator 310' similar to that which is described above with reference to FIG. 5. Specifically, SCR 318 has an anode 320 coupled to the circuit ground node 30, a cathode 322 coupled to the second output terminal 308, and a gate terminal 324 coupled to the third node 340. Zener diode 326 has a cathode 328 coupled to the circuit ground node 30 and an anode 330 coupled to the third node 340. Finally, biasing resistor 338 is coupled between the third node 340 and the second output terminal 308.

The detailed operation of the bootstrap power source 300' of FIG. 10 is largely analogous to that given above with regard to the circuit of FIG. 5. During negative half-cycles of $I_{LAMP}$, $I_{LAMP}$ flows up from ground node 30, through bootstrap diode 352, and into capacitor 360, and continues in this way until such time as $V_C$ increases to an appropriate level (e.g. 14.4 volts). When $V_C$ tries to exceed this level, the voltage between circuit ground node 30 and second output terminal 308 correspondingly attempts to exceed the reverse breakdown voltage (e.g. 15 volts) of zener diode 328. Consequently, zener 328 turns on and current flowing from cathode 328 to anode 330 is injected into the gate 324 of SCR 318. This causes SCR 318 to turn on and terminate the flow of replenishing current into capacitor 360 by reverse-biasing diode 350. SCR 318 then stays on for the remainder of the negative half-cycle of $I_{LAMP}$.

During positive half-cycles of $I_{LAMP}$, no replenishing current is provided to capacitor 360 since blocking diode 392 prevents the flow of any current into input terminal 302. The positive half-cycles of $I_{LAMP}$, which are used for purposes of power factor correction, are delivered to bulk capacitor 440 via feedback diode 244 (see FIG. 8).

The disclosed power supply 10 and ballast 20 employs a highly economical bootstrap power source that efficiently provides operating power to the inverter driver circuit and that, at the same time, provides automatic protection of the inverter in the event of removal or failure of the lamp or load. When used in an electronic ballast, the disclosed bootstrap source provides the added benefit of periodic re-strike attempts for igniting a replaced lamp without the need for cycling of the input power. Further, the disclosed bootstrap power source is realizable as a "floating" supply which operates off of the negative half-cycles of the load/ lamp current, and thereby reserves the positive half-cycles of the lamp current for other purposes, such as low cost power factor correction schemes. The end result is a power supply or ballast that is reliable, energy efficient, and highly economical with regard to material cost, physical size, and manufacturing effort.

Although the present invention has been described with reference to a certain preferred embodiment, numerous modifications and variations can be made by those skilled in the art without departing from the novel spirit and scope of this invention.

What is claimed is:

1. An electronic power supply circuit, comprising:
    an inverter, comprising:
        first and second input connections for receiving a source of voltage;
        first and second output connections, the second output connection being coupled to a circuit ground node;
        at least one inverter switch;
        an inverter driver circuit having:
            a dc supply input;
            a ground reference input; and
            at least one drive output coupled to the inverter switch;
    a series resonant output circuit, comprising:
        first and second input wires coupled to the inverter output connections;
        first and second output wires adapted for connection to a load;
        a resonant inductor coupled between the first input wire and a first node; the first node being coupled to the first output wire;
        a resonant capacitor coupled between the first node and the circuit ground node; and
        a dc blocking capacitor coupled between the second output wire and a second node; and
    a bootstrap power source coupled between the second node and the circuit ground node, the bootstrap power source comprising:
        a first input terminal coupled to the second node;
        a second input terminal coupled to the first input connection of the inverter;
        a first output terminal coupled to the dc supply input of the inverter driver circuit; and
        a second output terminal coupled to the ground reference input of the inverter driver circuit.

2. The power supply of claim 1, wherein the bootstrap power source is operable to:
    (i) supply continuous operating power to the inverter driver circuit when an operating load is present between the output wires; and
    (ii) protect the inverter by ceasing to supply continuous operating power to the inverter driver circuit when an operating load is not present between the output wires.

3. The power supply of claim 1, wherein the bootstrap power source further comprises:
    a shunt regulator coupled between the first input terminal and the circuit ground node;

a bootstrap rectifier coupled between the first input terminal and the first output terminal;

a filtering capacitor coupled between the first and second output terminals, the second output terminal being coupled to the circuit ground node; and a startup network coupled between the second input terminal and the first output terminal.

4. The power supply of claim 3, wherein:

the bootstrap rectifier comprises a bootstrap diode having an anode coupled to the first input terminal and a cathode coupled to the first output terminal of the bootstrap power source; and the startup network comprises a startup resistor coupled between the second input terminal and the first output terminal of the bootstrap power source.

5. The power supply of claim 4, wherein the shunt regulator comprises a zener diode having a cathode coupled to the first input terminal and an anode coupled to the circuit ground node.

6. The power supply of claim 5, wherein the bootstrap power source further comprises a bypass capacitor coupled between the first input terminal and the circuit ground node.

7. The power supply of claim 4, wherein the shunt regulator comprises:

an electronic switch coupled between the first input terminal and the circuit ground node, the electronic switch having a gate terminal coupled to a third node;

a zener diode having a cathode coupled to the first input terminal and an anode coupled to the third node;

a biasing resistor coupled between the third node and the circuit ground node; and a bypass diode having a cathode coupled to the first input terminal and an anode that is coupled to the circuit ground node.

8. The power supply of claim 7, wherein the electronic switch comprises a SCR having an anode coupled to the first input terminal, a cathode coupled to the circuit ground node, and a gate terminal coupled to the third node.

9. The power supply of claim 1, wherein the bootstrap power source further comprises:

a shunt regulator coupled between the circuit ground node and the second output terminal;

a bootstrap rectifier coupled between the circuit ground node and the first output terminal;

a blocking rectifier coupled between the first input terminal and the second output terminal;

a filtering capacitor coupled between the first and second output terminals; and a startup network coupled between the second input terminal and the first output terminal.

10. The power supply of claim 9, wherein:

the bootstrap rectifier comprises a bootstrap diode having an anode coupled to the circuit ground node and a cathode coupled to the first output terminal;

the blocking rectifier comprises a blocking diode having a cathode coupled to the first input terminal and an anode coupled to the second output terminal; and the startup network comprises a startup resistor coupled between the first input terminal and the first output terminal.

11. The power supply of claim 10, wherein the shunt regulator comprises a zener diode having a cathode coupled to the circuit ground node and an anode coupled to the second output terminal of the bootstrap power source.

12. The power supply of claim 11, wherein the bootstrap power source further comprises a bypass capacitor coupled between the second output terminal and the circuit ground node.

13. The power supply of claim 10, wherein the shunt regulator comprises:

an electronic switch coupled between the second output terminal and the circuit ground node, the electronic switch having a gate terminal coupled to a third node;

a zener diode having a cathode coupled to the circuit ground node and an anode coupled to the third node; and a biasing resistor coupled between the third node and the second output terminal.

14. The power supply of claim 13, wherein the electronic switch comprises a SCR having a cathode coupled to the second output terminal, an anode coupled to the circuit ground node, and a gate terminal coupled to the third node.

15. The power supply of claim 1, wherein the inverter is a half-bridge inverter, comprising:

a first inverter switch coupled between the first input connection and the first output connection of the inverter; and a second inverter switch coupled between the circuit ground node and the first output connection of the inverter.

16. The power supply of claim 1, wherein the load comprises at least one gas discharge lamp.

17. An electronic ballast for powering at least one gas discharge lamp, comprising:

an AC/DC converter having a pair of input wires and a pair of output wires, the input wires being adapted to receive a source of alternating current;

a half-bridge inverter, comprising:

first and second input connections coupled to the output wires of the AC/DC converter, the second input connection being coupled to a circuit ground node;

first and second output connections, the second output connection being coupled to the circuit ground node;

a first inverter switch coupled between the first input connection and the first output connection;

a second inverter switch coupled between the first and second output connections; and an inverter driver circuit having:

a dc supply input;

a ground reference input;

a first drive output coupled to the first inverter switch; and a second drive output coupled to the second inverter switch;

a series resonant output circuit, comprising:

first and second input wires coupled to the inverter output connections;

a resonant inductor coupled between a first node and the first input wire of the output circuit;

a resonant capacitor coupled between the first node and the circuit ground node;

first and second output wires for connection to at least one fluorescent lamp, the first output wire being coupled to the first node; and a dc blocking capacitor coupled between the second output wire and a second node; and a bootstrap power source coupled between the second node and the circuit ground node, the bootstrap power source comprising:

a first input terminal coupled to the second node;

a second input terminal coupled to the first input connection of the inverter;

a first output terminal coupled to the dc supply input of the inverter driver circuit;

a second output terminal coupled to the ground reference input of the inverter driver circuit;

a shunt regulator coupled between the first input terminal and the circuit ground node;

a bootstrap diode having an anode coupled to the first input terminal and a cathode coupled to the first output terminal;

a filtering capacitor coupled between the first and second output terminals, the second output terminal being coupled to the circuit ground node; and a startup resistor coupled between the second input terminal and the first output terminal.

18. The electronic ballast of claim 17, wherein the shunt regulator comprises a zener diode having a cathode coupled to the first input terminal and an anode coupled to the circuit ground node.

19. The electronic ballast of claim 17, wherein the shunt regulator comprises:

an electronic switch coupled between the first input terminal and the circuit ground node, the electronic switch having a gate terminal coupled to a third node;

a zener diode having a cathode coupled to the first input terminal and an anode coupled to the third node;

a biasing resistor coupled between the third node and the circuit ground node; and a bypass diode having a cathode coupled to the first input terminal and an anode coupled to the circuit ground node.

20. An electronic ballast for powering at least one gas discharge lamp, comprising:

an AC/DC converter having a pair of input wires and a pair of output wires, the input wires being adapted to receive a source of alternating current;

a half-bridge inverter, comprising:

first and second input connections coupled to the output wires of the AC/DC converter, the second input connection being coupled to a circuit ground node;

first and second output connections, the second output connection being coupled to the circuit ground node;

a first inverter switch coupled between the first input connection and the first output connection;

a second inverter switch coupled between the first and second output connections; and an inverter driver circuit having:

a dc supply input;

a ground reference input;

a first drive output coupled to the first inverter switch; and a second drive output coupled to the second inverter switch;

a series resonant output circuit, comprising:

first and second input wires coupled to the inverter output connections;

a resonant inductor coupled between a first node and the first input wire of the output circuit;

a resonant capacitor coupled between the first node and the circuit ground node;

first and second output wires for connection to at least one fluorescent lamp, the first output wire being coupled to the first node; and a dc blocking capacitor coupled between the second output wire and a second node; and a bootstrap power source coupled between the second node and the circuit ground node, the bootstrap power source comprising:

a first input terminal coupled to the second node;

a second input terminal coupled to the first input connection of the inverter;

a first output terminal coupled to the dc supply input of the inverter driver circuit;

a second output terminal coupled to the ground reference input of the inverter driver circuit;

a zener diode having a cathode coupled to the circuit ground node and an anode coupled to the second output terminal;

a bootstrap diode having an anode coupled to the circuit ground node and a cathode coupled to the first output terminal;

a blocking diode having a cathode coupled to the first input terminal and an anode coupled to the second output terminal;

a filtering capacitor coupled between the first and second output terminals; and a startup resistor coupled between the first input terminal and the first output terminal.

* * * * *